US005517649A

United States Patent [19]
McLean

[11] Patent Number: 5,517,649
[45] Date of Patent: May 14, 1996

[54] ADAPTIVE POWER MANAGEMENT FOR HARD DISK DRIVES

[75] Inventor: Peter T. McLean, Boulder, Colo.

[73] Assignee: Maxtor Corporation, Longmont, Colo.

[21] Appl. No.: 229,642

[22] Filed: Apr. 19, 1994

[51] Int. Cl.⁶ .............................. G06F 13/10; G06F 15/60
[52] U.S. Cl. ........................... 395/750; 364/488; 364/489
[58] Field of Search .............................. 395/750; 364/488, 364/489

[56] References Cited

U.S. PATENT DOCUMENTS

| | | | |
|---|---|---|---|
| 4,827,428 | 5/1989 | Dunlop et al. | 364/491 |
| 4,933,785 | 6/1990 | Morehouse et al. | 360/78.04 |
| 5,167,024 | 11/1992 | Smith et al. | 395/375 |
| 5,392,221 | 2/1995 | Donath et al. | 364/489 |
| 5,404,543 | 4/1995 | Faucher et al. | 395/750 |

Primary Examiner—Jack B. Harvey
Assistant Examiner—Jeffrey K. Sato
Attorney, Agent, or Firm—Sheridan Ross & McIntosh

[57] ABSTRACT

A method of managing the power consumed by a hard disk drive in a portable computer. The first step consists of measuring the work load placed on the hard disk drive by a particular computer, a particular application and a particular user. The next step is to determine the average power consumed in the disk drive in the active state and in a lower power state for a series of wait times. The next step is to determine the total average power consumed by the disk drive for both states for the series of wait times. The next step is to determine the wait time at which the total average power consumed by the disk drive in minimum. The final step is to set the wait time at which the disk drive operates to the previously determined minimum wait time.

31 Claims, 6 Drawing Sheets

ADAPTIVE POWER MANAGEMENT FOR HARD DISK DRIVES

BACKGROUND OF THE INVENTION

Field of the Invention

The present invention relates generally to disk drives for portable and desk top computers. More particularly, it relates to a power management method for hard disk drives used in such computers that optimizes around each user.

Portable computers using battery power are becoming increasingly popular and are evolving rapidly. As more and more efficient logic and displays become available, the dominant factor in determining battery life is the hard disk drive. If hard disk drives are not able to improve their efficiency, the computer users of the future will seek other forms of mass storage to achieve acceptable levels of battery life. Thus, improvement in the energy efficiency of hard disks drives will be critical to their ability to continue as the low cost storage device of choice.

One approach to reducing hard disk power consumption is to work on improving the efficiency of the electromechanical apparatus of the drive. A second approach to improving hard disk power consumption is to attack the method in which the hard disk drive is used.

Some work has been done on the second approach, but it is limited in scope and is totally controlled by the host processor.

The work previously done starts with ANSI ATA. This group has defined four power states that a drive may occupy. These states are:

Sleep: This is the lowest power consumption state. The drive requires a reset to be activated and the time to respond to an access command from this state could be 30 seconds or more. This implies that the disk is spun down, the heads are unloaded or out of the data zone, the internal drive processor is turned off, and all of the interface logic is turned off except the reset recognition logic.

Stand By: In this state, the drive is capable of accepting commands, but the media is not immediately accessible. It could take as long as 30 seconds or more to respond to an access command from this state. This implies that the disk is spun down and the heads parked but the internal processor and interface are still active.

Idle: In this state, the drive is capable of responding immediately to media access requests but may take longer to complete the execution of a command because it may be necessary to activate some circuitry. This implies the disk is spinning, the internal processor and interface electronics are active, but the servo system controlling the head position or some other circuitry may be inactive.

Active: The active state is the normal operating state of a disk drive from which it responds to all access requests in the minimum time of which it is capable. This implies that the disk is spinning, the heads are actively being controlled by the servo system and all circuitry is active.

To date, ANSI ATA has developed interface standards that define commands that allow the host computer to place the disk drive into the power states previously defined, or to set timers for determining when the drives should switch states automatically.

U.S. Pat. No. 4,933,785, issued to Morehouse, et al, describes power saving states which are equivalent to the ANSI ATA idle and stand by states and describes using the states with fixed wait times either as a default or host defined. The Morehouse patent teaches switching the drive to the lower power state after a predetermined and fixed wait time. Wait time is defined as the time after the finishing of the last access request before the drive is switched to a lower power state. In practice, after finishing an access to the disk drive, the host would start a wait time counter. If access to the disk drive is needed during the defined wait time, the access request is executed and the wait time clock is reset to zero and restarted. If a request is not received before the wait time counter times out, the drive switches to the lower power state. Any requests received thereafter are responded to from the lower power state. However, Morehouse does not define any criteria or method for determining how long the wait time should be.

OBJECTS OF THE INVENTION

It is therefore an object of the invention to determine the wait time at which the total power consumed by the hard disk drive is minimized based upon monitoring the work load of the individual computer system and user.

It is another object of the invention to provide a generalized method of determining the work load presented by the particular user and host computer to the hard disk drive.

It is yet another object of the invention to provide a highly efficient method of determining the wait time that yields the minimum average power for each user.

SUMMARY OF THE INVENTION

These and other objects of the invention are accomplished by first gathering statistics of a particular drive, computer and user. The statistics are a histogram of the arrival time of requests from the host. The next step is to determine the total power consumed by the disk drive as a function of wait time given the arrival time histogram. The next step is to determine the wait time that gives minimum power consumption. Finally the drive is switched to a lower power state if a request for access does not arrive prior to the end of the wait time that gives minimum power.

The foregoing general method when applied to the use of two states, active and sleep, includes the steps of determining the percent of requests done from the active state and the average power consumed by the requests from the active state as a function of wait time. Also the percent of requests done from the sleep state and the average power consumed by the requests from sleep state as a function of wait time are determined. The sum of these two average power functions represents the total average power required to respond to all requests from the host as a function of wait time. The next step in the method is to determine the wait time at which the total average power is a minimum. This occurs when the slope of the total power curve is zero.

A particularly efficient method of determining the wait time at which the total average power is minimized for a given work load consists of determining the slope of the average power consumed for requests done from the active state as a function of wait time and the slope of the average power consumed for requests done from the sleep state as a function of wait time and comparing the two. Their absolute values are equal at the wait time that yields the minimum power.

The optimum wait time is converged upon in an iterative process that samples the workload, computes the number of responses made from the active state as a percent of the total number of responses in the sample and the average time before a response from the active state occurs. From this the slopes of the average active and average sleep powers curves are calculated.

BRIEF DESCRIPTION OF THE DRAWING

The invention now will be more fully described in connection with the drawing wherein.

DETAILED DESCRIPTION OF THE PREFERRED EMBODIMENT

The factors that determine the power used by a disk drive are: the power required in each of the states in which it can operate, the power required to make a transition from one state to another and the time spent in each state. The time spent executing a read or write command is a function of both the drive performance characteristics and the state of the drive when the request is placed by the host computer. Thus, both the drives characteristics and the host computers workload characteristics affect power consumption and both must be accounted for to manage power consumption in an optimal manner.

Determining the workload that is offered to a disk drive by the host computer is a key component of the present invention. Certainly different host computers have different performance characteristics that affect the workload. However, the workload is affected as much by the type of work being done as by the type of processor. For example, using a word processing program to write documents presents a very different workload than sorting a data base or executing an iterative algorithm. Each application that a user runs has its own workload characteristics, and the workload will often be affected by the particular user. For example, different users type at different speeds; some users are more proficient with a particular application than others and thus spend less time thinking about the next key stroke; and some users may spend more time drinking coffee. As a result of the foregoing, it is impossible to optimize power consumption by the use of an arbitrary fixed wait time.

Figure 1:
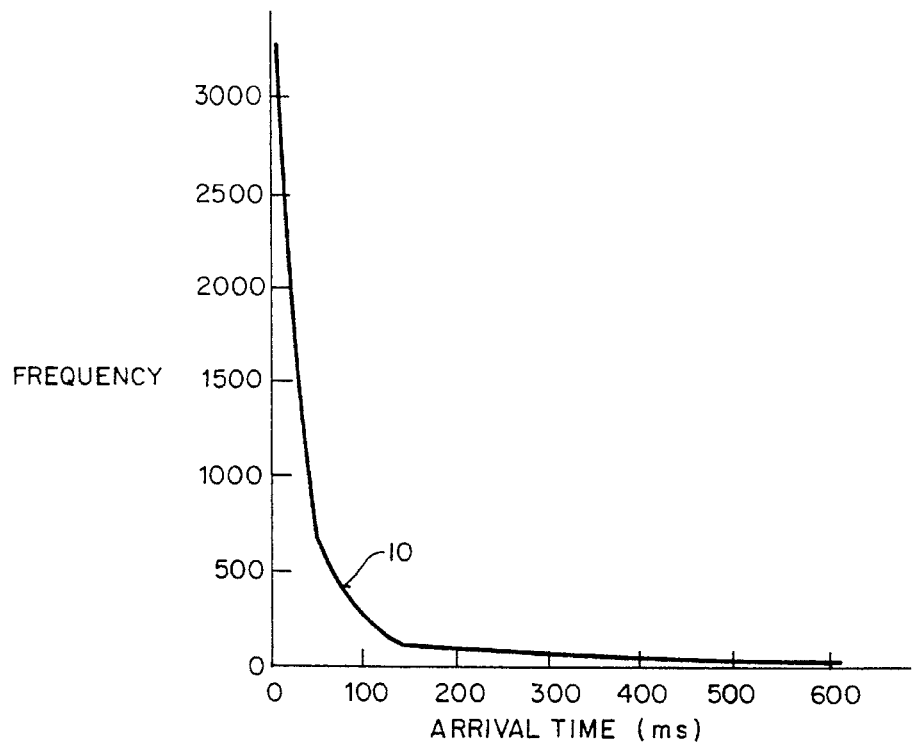
FIG. 1 is a histogram of the arrival times of requests for access to the disk drive made by the host computer.

FIG. 1 is a histogram. The units on the abscissa are arrival times in milliseconds and the units on the ordinate are the frequency with which an arrival time occurs. Arrival time is the period of time between the arrival at the disk drive of two sequential requests from the host computer. Referring to FIG. 1, curve 10 is fitted to empirical data taken from a disk drive used in a desk top computer. As can be seen, the frequency of arrival times of less than 100 milliseconds is much greater than the frequency of longer arrival times This is because, in this time range, the time between requests reflects the time taken by the computer to perform a function before requiring additional data from the hard disk. However, as can be seen, curve 10 has a long tail stretching out to the right in which the arrival times are long but the frequency of arrival times is low. This portion of the curve reflects the interaction of the computer and user. For example, in an extreme case, running to minutes, events in the tail of the curve may reflect the user getting a cup of coffee or going to lunch.

While the principles of the present invention apply to determining when to change between all of the power states set out previously, the preferred embodiment of the invention uses only the two extreme states: sleep and active.

Figure 2:
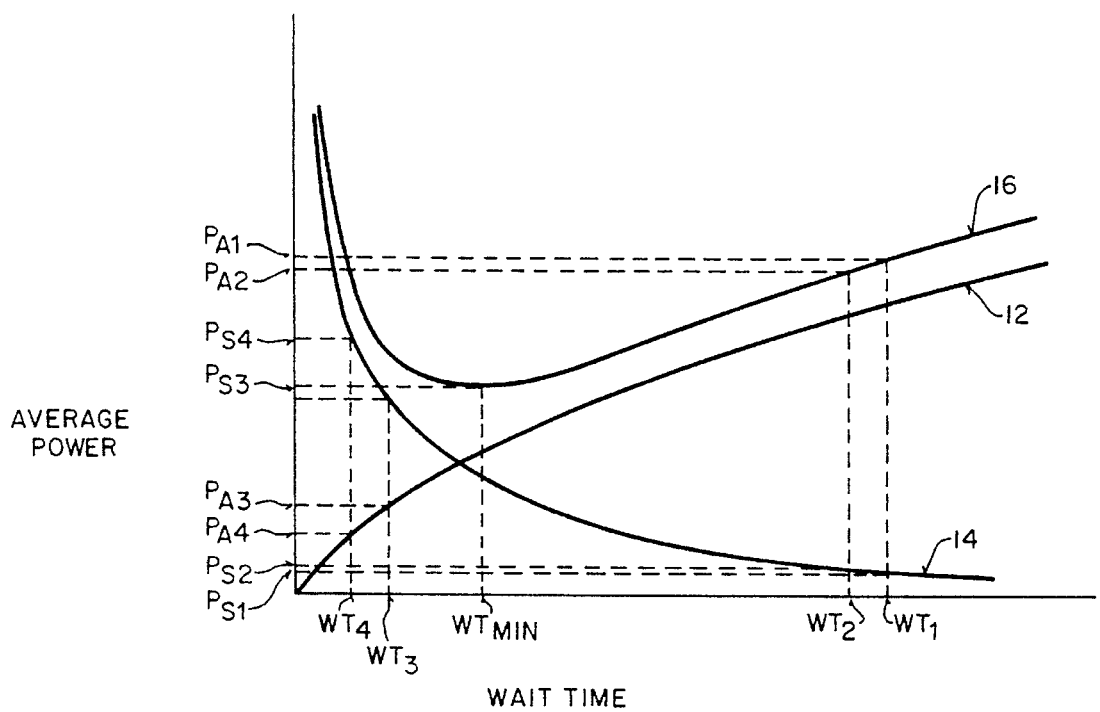
FIG. 2 is an idealized graph of the average power consumed by the disk drive as a function of wait time.

In FIG. 2, the units on the abscissa are wait time in milliseconds and the units on the ordinate are the average power consumed by the disk drive. Wait time is defined as the time interval after which the drive is switched to the sleep state unless another request has been received. That is, after finishing a host request such as a read or write to the disk drive, a timer is set with a fixed wait time. If a request from the host comes during the fixed wait time, the request is executed and the timer is reset. If a request does not come during the fixed wait time, the drive is switched into the sleep state when the timer times out.

Referring now to FIG. 2, curve 12 represents the average power consumed by the disk drive due to requests from the host out of the active state as a function of wait time, and given the distribution of arrival times as shown in FIG. 1. With a wait time of zero seconds, all requests are done from the sleep state and the power required from the active state is zero. As the wait time increases, the power consumed out of the active state increases rapidly and then gradually tapers off. The initial rapid increase is due to the high frequency of short arrival times as shown in FIG. 1. In the extreme case of a very large wait time, substantially all requests would be performed from the active state.

Curve 14 shows the average power consumed by requests for disk drive access from the host while the drive is in the sleep state as a function of wait time and given the distribution of arrival times shown in FIG. 1. At a wait time of zero, the disk drive is always in the sleep state and thus all requests are performed out of the sleep state. In this case, the average power is very high-approaching 3 watts. However, as the wait time increases, the power needed to service requests from the sleep state (the "sleep power") decreases—initially at a very rapid rate. The initial rapid decrease is because a very high number of requests have short arrival times as shown in FIG. 1. As the wait time increases further, the average sleep power continues to decrease but at a much lower rate. This reflects the relative scarcity of long arrival time requests in the distribution of FIG. 1.

Curve 16 represents the total average power required to service all requests coming from the host as a function of wait time. It is the sum of curves 12 and 14. As can be seen from FIG. 2, curve 16 has a minimum at the point on the abscissa labeled $WT_{min}$. The total power at a wait time of zero is made up exclusively of the sleep power. Total power curve 16 substantially tracks sleep power curve 14 initially. As the wait time increases, total power curve 16 gradually diverges from sleep power curve 14. This reflects the increased contribution from active power curve 12. Total power curve 16 continues to decrease with increasing wait time until it reaches a minimum, and then it gradually increases as the power required to service requests from the active state more than offsets the decreased power from the sleep state. An objective of the invention is to operate the disk drive with a wait time corresponding to the minimum power point of curve 16.

In order to construct the curve of FIG. 2, it is necessary to determine the average power consumed by requests executed from the active state and the average power consumed by requests executed from the sleep state. With this information, the total power curve may be calculated and the remainder of the preferred method may by implemented. The average power consumed by requests executed from the active state is set out in Equation 1 below:

$$P_{Active} = \%_A \frac{t_{awA}P_a + t_{seek}P_{seek} + t_r\frac{P_a}{2} + \frac{S_u t_r P_d}{S_r}}{t_{awA} + t_{seek} + \frac{t_r}{2} + \frac{S_u t_r}{S_r}} \quad (1)$$

where:

$P_{Active}$ is the average power consumed by requests executed from the active state.

$\%_A$ is the percentage of total requests that are executed from Active state for a given wait time.

$t_{awa}$ is the average time in Active state waiting for the request to arrive.

$P_a$ is the power consumed while in Active State.

$t_{seek}$ is the average seek time to execute a request.

$P_{seek}$ is the power consumed while seeking.

$t_r$ is the rotation time for the disk.

$S_u$ is the number of sectors the user requested to be transferred.

$S_r$ is the number of sectors in a revolution of the disk.

$P_d$ is the power consumed while transferring the requested data.

The first term of Equation 1 represents the power consumed in active state waiting for the request to arrive and the last three terms represent the power consumed executing the request.

The average power consumed by requests executed from the sleep state is set out in Equation 2 below:

$$P_{Sleep} = \%_S \frac{t_{wait}P_a + t_{unl}P_{seek} + t_{aws}P_{sl} + t_{su}P_{su} + t_{ld}P_{seek} + \frac{t_r P_A}{2} + \frac{S_u t_r P_d}{S_r}}{t_{wait} + t_{unl} + t_{aws} + t_{su} + t_{ld} + \frac{t_r}{2} + \frac{S_u t_r}{S_r}} \quad (2)$$

where:

$P_{Sleep}$ is the average power consumed by requests executed from the Sleep state.

$\%_S$ is the percentage of total requests that are executed from Sleep state for a given wait time.

$t_{wait}$ is the time in Active state before placing the drive in Sleep state.

$P_a$ is the power consumed while in Active State.

$t_{unl}$ is the time to unload or park the heads when entering Sleep state.

$P_{seek}$ is the power consumed while seeking.

$t_{aws}$ is the average time in Sleep state waiting for a request to arrive.

$P_{sl}$ is the power consumed while in Sleep state.

$t_{su}$ is the time to spin up the disk when returning from Sleep state to Active state.

$P_{su}$ is the power consumed spinning up the disk.

$t_{ld}$ is the time to move the heads to the requested track when returning to Active state.

$t_r$ is the rotation time for the disk.

$S_u$ is the number of sectors the user requested to be transferred.

$S_r$ is the number of sectors in a revolution of the disk.

$P_d$ is the power consumed while transferring the requested data.

In this case, the first term of Equation 2 represents the power consumed while in active state during the wait time before going to sleep. The second term is the power use to go from the active to the sleep state. The third term represents the power consumed in the sleep state while waiting for the request to arrive. The fourth term is the power consumed in spinning up the drive when returning from the sleep state and again the last three terms represent the power consumed executing the request.

Collecting the distribution as shown in FIG. 1, calculating the average power curve as shown in FIG. 2, and then finding the minimum of that curve in order to find the proper wait time is however a task requiring considerable compute overhead. If this process were performed by the disk drive itself, it would add a time overhead to each request that was executed. In addition, the time a drive spends in sleep cannot easily be determined since in most instances the drive's clocks are turned off when in this state. And being unable to determine the time spent in sleep eliminates any algorithm requiring the average time in the sleep state as a parameter. If this process were performed by the host computer, it would merely add to the overall compute overhead. Accordingly, another aspect of the present invention is a method that, while based on the principles previously described, is efficient and may be performed by the disk drive since it does not require determining the time spent in the sleep state.

Referring again to Equation 1, only $\%_A$ and $t_{awa}$ are dependent on the workload. $P_A$, $P_{seek}$, $t_r$, $S_r$, and $P_d$ are all values that are disk drive specific and typically can be ascertained from the specification sheet for the particular disk drive. $S_u$ and $t_{seek}$ are normally "rule of thumb" values, with 4 being used for $S_u$ and 40% of the drive's average seek time being used for $t_{seek}$. Therefore, for the implementation in a given drive Equation 1 can be reduced to the form of Equation 3.

$$P_{Active} = \%_A \frac{t_{awA}P_a + C_1}{t_{awA} + C_2} \quad (3)$$

where $C_1$ and $C_2$ are constants for that drive.

Referring again to Equation 2 only $\%_S$ and $t_{aws}$ are dependent on the workload. The remaining terms are a function of the characteristics of the particular drive implemented. Since $\%_A$ and $\%_S$ represent all of the requests presented to the drive by the host.

$$\%_S = 1 - \%_A \quad (4)$$

Figure 3:
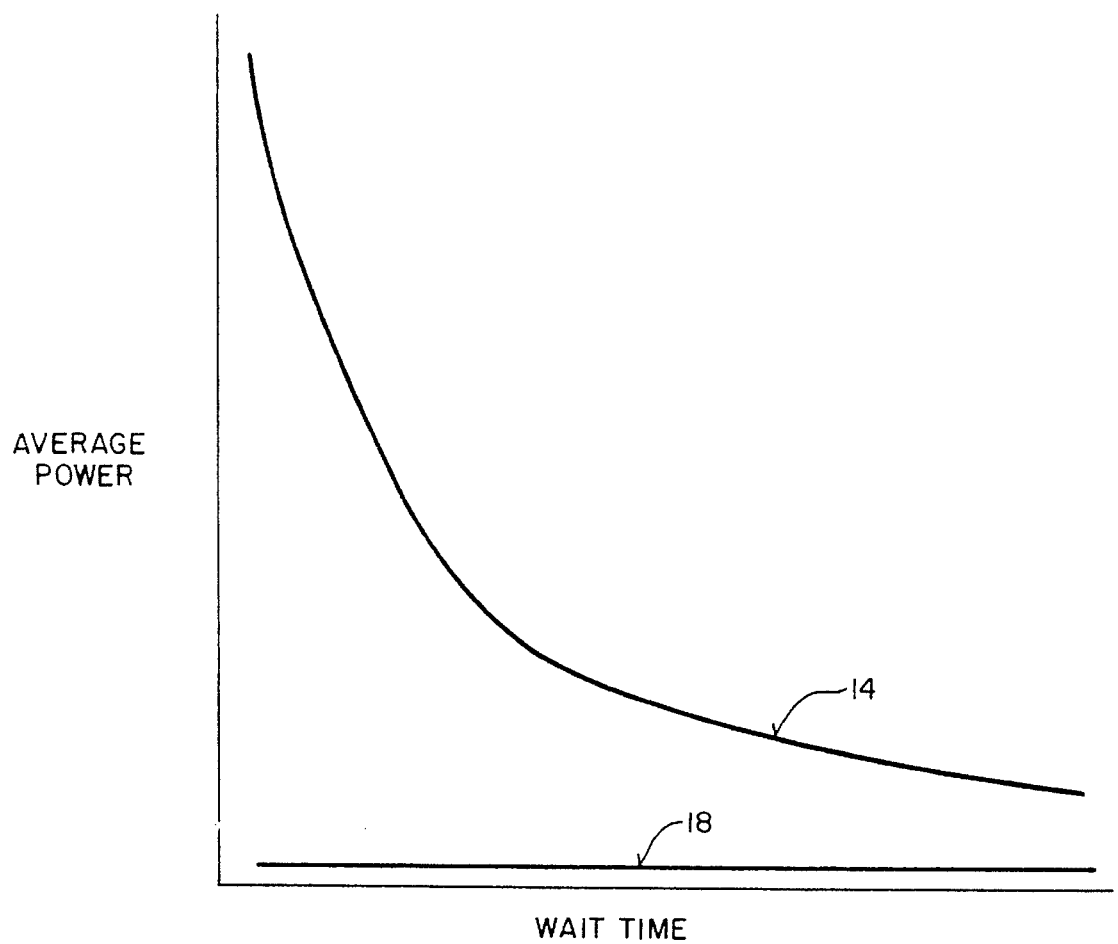
FIG. 3 is a graph of the average power consumed while waiting for a request in the sleep state.

In a typical disk drive, the power comsumed while in the sleep state is very small compared to the power needed for all other activities. This point is illustrated graphically in FIG. 3. FIG. 3 is an idealized graph of the average power for requests executed from the sleep state as a function of wait time for a typical drive. The units on the abscissa are wait time in milliseconds and the units on the ordinate are average power in milliwatts. Curve 14 of FIG. 3 shows the average power for requests executed from the sleep state as a function of wait time. This is the same curve as set out in FIG. 2. Curve 18 represents the power consumed while waiting in the sleep state. As can be seen, the contribution of the power represented by curve 18 is a small fraction of the total power represented by curve 14. Also, curve 18 is substantially flat and adds nothing to the slope of curve 14.

If the term, $t_{aws}$, in Equation 2 corresponding to curve 18 is ignored, and the other simplifying assumptions used for Equation 3 are made, then Equations 2 can be rewritten as Equation 5 below:

$$P_{Sleep} = (1 - \%_A) \frac{t_{wait}P_a + C_3}{t_{wait} + C_4} \quad (5)$$

where $C_3$ and $C_4$ are constants for a particular drive.

The preferred method is based on reduced Equations 3 and 5 and the fact that the minimum average power occurs at the value of wait time where the slope of the average power consumed by requests from the active state is equal to the negative slope of the average power consumed by requests from the sleep state. That is, the absolute value of the two slopes are equal.

Figure 4:
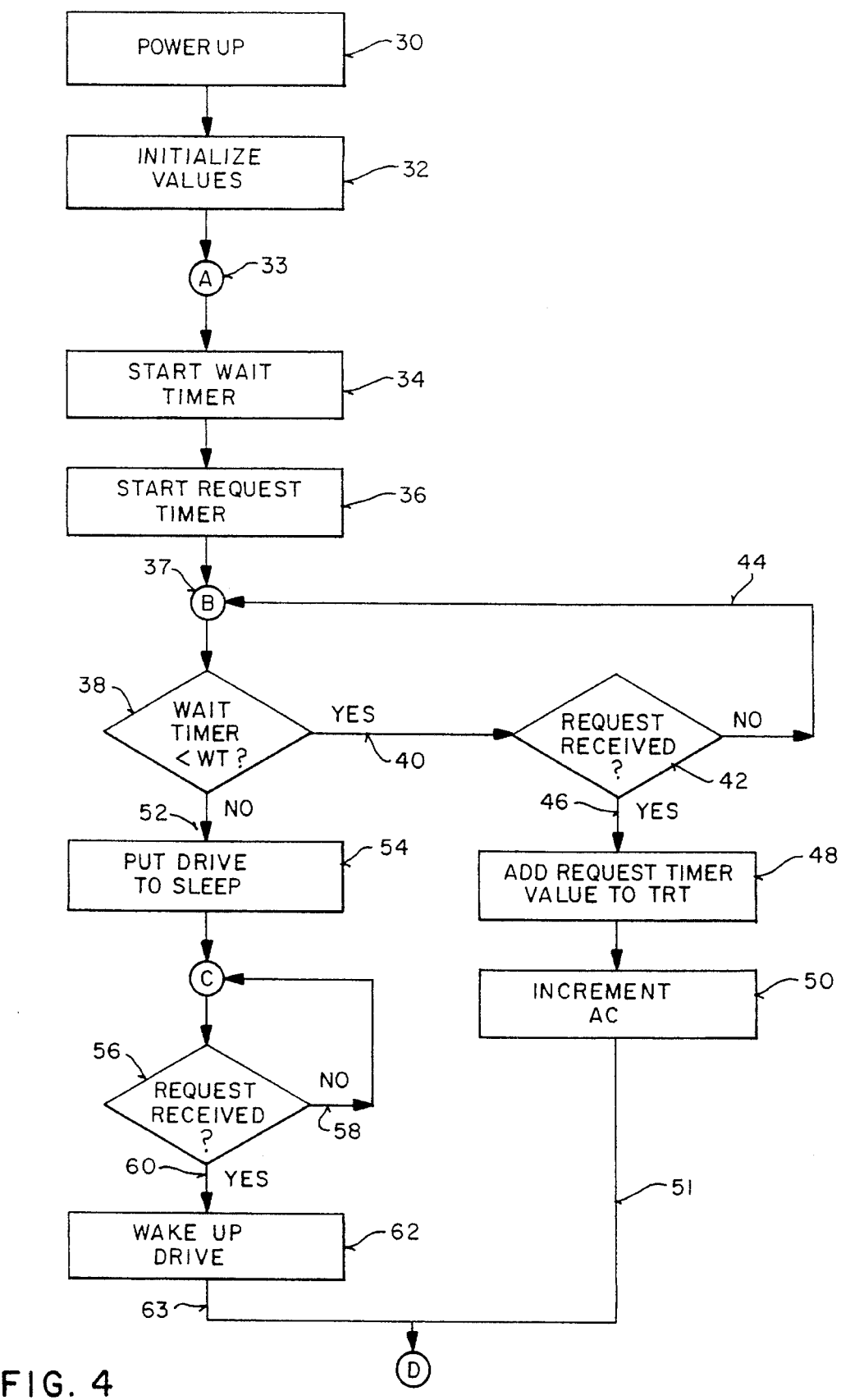
FIG. 4 is a flow chart of a preferred embodiment of the present invention.

Referring now to FIG. 4, block 30 labeled POWER UP refers to the requirement that the disk drive be brought to the operational state. That is, it must be powered, fully up to speed and all circuits must be active. The first step in the process is to initialize certain variables as indicated by processing block 32, labeled INITIALIZE VALUES. At this point a wait time variable, "WT", is set to its first value starting wait time, SWT. This is a value that is an estimate of the ultimate minimum power wait time and is required to commence the iterative process of the method of the present invention. As will be seen in the following paragraphs, the method of the preferred embodiment is iterative with different values of WT. Typical SWT values might be 5 seconds for a 1.8" disk drive, 10 seconds for a 2.5" disk drive or 20 seconds for a 3.5" disk drive. In addition, a counter for received requests, RC, is initialized to zero. A request time clock, RT, the time since the last request, is set to zero. A counter for requests received while in the active state, AC, is initialized to zero. The previous active power $PP_A$, previous sleep power $PP_S$ and total request time TRT are also initialized to zero. Finally the variable DWN, is initialized to either a logic one or zero. In addition, prior to commencing the method, the following predetermined constants are set:

SS, is the predetermined sample size used to estimate the work load. That is, the work load is an ongoing and endless population of requests for access to the drive. In principle, it is all of the requests ever made while the drive is in operation, and could stretch over years. The sample is used to estimate the population distribution. Conventional statistical techniques are used to determined the sample size. In the preferred embodiment, the sample size is 100 received requests. I, is the predetermined wait time increment. I is the number in seconds that the wait time is incremented, either up or down, in the iterative process of this method. A typical wait time increment would be 1 second.

From processing block 32 follow process path 33 to flow chart reference A. In this process flow chart, the letters A through G are used to join parts of the flow chart that would be inconvenient to join with solid lines. In processing block 34, the wait timeclock is started. This is a clock/counter incremented by an internal clock and indicates the elapsed time since the previous request was executed. In processing block 36, the request timer, RT is started. Next, follow process path 37 through flow chart reference B to decision block 38.

In decision block 38, the wait timer is tested against the value of wait time variable, WT. If the value of the wait timer is less than WT, follow process path 40 to decision block 42. Decision block 42 tests to determine if a request for access to the disk drive has been received from the host. If the answer is no, follow process path 44 back to flow chart reference B and repeat. Thus the loop consisting of decision block 38 and decision block 42 and process paths 40 and 44 watches the wait timer and looks for requests from the host.

If a request receipt is determined by decision block 42, then the request is being executed from the active state. That is, the request arrives prior to the expiration of the wait timer which has been set to the value of as specified by the variable WT. In this case follow processing path 46 to processing block 48. In processing block 48, the value of the request time clock, RT, the time since the last request, is added to the total request timer, TRT, value. The total request timer, TRT, contains the total time that the disk drive spends waiting to execute requests from the active state. Dividing this time by the number of requests executed from the active state will yield the average time waiting for these requests. In block 50, the active state counter, AC, is incremented by a count of 1. From processing block 50 follow process path 51 through reference D to processing block 64 in FIG. 5.

Referring back to decision block 38, if the wait time clock reaches WT before a request is received from the host, follow process path 52 to processing block 54. In processing block 54 the disk drive is switched to the sleep state. From processing block 54, follow process path 55 through reference C to decision block 56. At this point the drive is in the sleep state waiting for an access request from the host. Decision block 56 tests to determine if a request for access to the disk drive has been received from the host. If the answer is no, follow process path 58 through reference C and back to decision block 56. Thus the loop consisting of decision block 56 and process path 58 looks for a request from the host while the drive is in the sleep state.

When a request from the host is received as determined by decision block 56, follow processing path 60 to processing block 62. In processing block 62, the disk drive is returned from the sleep state to the active state. From processing block 62 follow processing path 63 through reference D to processing block 64 in FIG. 5. So far in the process, the statistics for a single request have been gathered.

Figure 5:
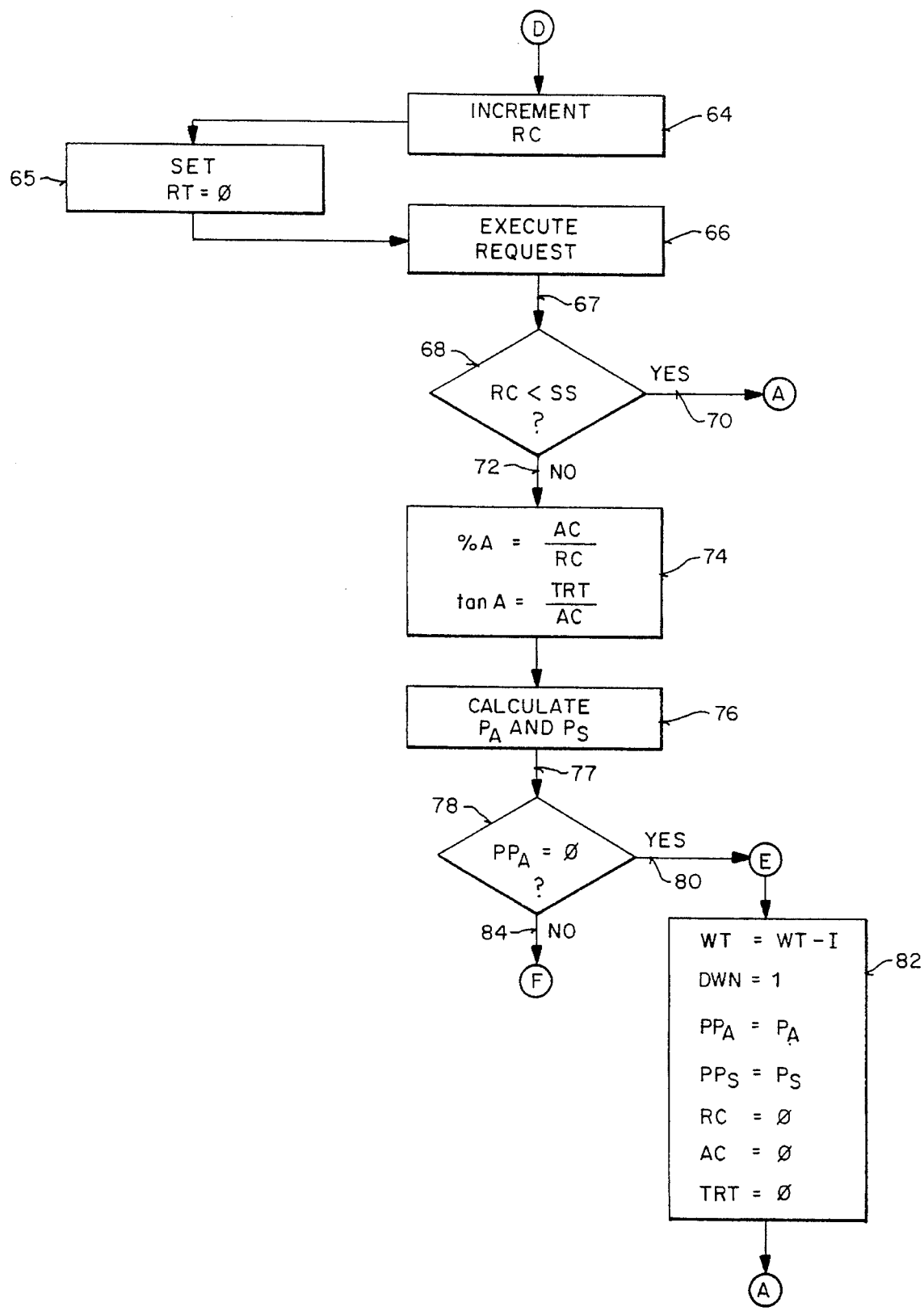
FIG. 5 is a continuation of the flow chart of FIG. 4.

Referring now to FIG. 5, in processing block 64, the request count, RC, is incremented. In processing block 65, the request timer, RT, is reinitialized to zero. In processing block 66, the disk drive executes the access requested by the host processor. Next follow processing path 67 to decision block 68.

In decision block 68, the request counter, RC, is compared to the predetermined sample size value, SS. If RC is less than SS, a statistically significant sample has not yet been gathered and processing path 70 is followed through reference A back to processing block 34 in FIG. 4. If RC has reached the value of SS, follow processing path 72 to processing block 74.

In process block 74, the percentage of the total requests executed from the active state, $\%_A$, is calculated by dividing AC by RC; and the average time in active state waiting for a request to arrive, $t_{awa}$, is calculated by dividing the total request time, TRT, (the total time waiting for requests that were executed from active state) by the total number of requests executed from active state which is the value of active state counter AC.

In processing block 76, $P_{Active}$ and $P_{sleep}$ are calculated using Equations 3 and 5 respectively. The constants $P_a$, $C_1$, $C_2$, $C_3$, and $C_4$ will have been predetermined based on the characteristics of the disk drive on which the invention is being implemented. The wait time, $t_{wait}$, is the current value of WT.

So far in the process, one point on curve 12 and one point on curve 14 of FIG. 2 have been determined. The next major step is to calculate a second point for each of these curves.

From processing block 76 follow the process path 77 to decision block 78. In decision block 78, if the previous value of active power, $PP_A$, is zero, only one point on curves 12 and 14 of FIG. 2 has so far been calculated since the disk drive was powered up. Thus, since there is only one point on curves 12 and 14 it is not possible to calculate the slopes of those curves. In this case, follow process path 80 through reference E to process block 82. In process block 82, values are reinitialized to gather another sample. In process block 82, DWN is set to 1 and WT is decreased by the increment value, I. The active power value just calculated and stored in $P_A$ is transferred to the previous active power value variable, $PP_A$. Likewise, the sleep power value just calculated and stored in $P_S$ is transferred to the previous sleep power value variable, $PP_S$. RC, AC, and TRT are set to zero. From processing block 82, follow through reference A to processing block 34 in FIG. 4 and commence the process for calculating the next points on curves 12 and 14.

Referring back to decision block 78 in FIG. 5, if the value of $PP_A$ is not zero, then this is not the first points on curve 12 and 14 to be determined since the disk drive was powered up. Two points each on curves 12 and 14 are known and the slope between these points can be calculated. To do this, follow processing path 84 through reference F to decision block 86 in FIG. 6.

In decision block 86, the value of DWN is tested. The variable, DWN, determines whether the current sample is with a wait time that is longer or shorter than the previous sample and thus either to the left or right of the previous points on curves 12 and 14. Depending on whether or not the new sample is to the left or right of the previous sample, the slope would be reversed and thus the signs reversed. If the value of DWN is one, the value of WT was reduced by I between this sample and the previous sample and processing path 88 is followed to decision block 90.

In decision block 90, the slope of the active power curve is compared to the slope of the sleep power curve. If the slope of the active power curve for the two points $P_A$ and $PP_A$ is greater than that of the corresponding sleep power curve, then the two points, $P_A$ and $PP_A$, must lie to the right of the minimum power point on total power curve 16 in FIG. 2.

The foregoing logic can be best understood by referring to FIG. 2. To the left of the minimum point, $WT_{min}$, on total power curve 16, the absolute value of the slope of sleep power curve 14 is greater than the absolute value of the slope of active power curve 12. This is consistent with the fact that the total power curve decreases as the sleep power curve decreases in this area. In contrast, to the right of the minimum power point, $WT_{min}$, on total power curve 16, the absolute value of the slope of the active power curve is greater than the absolute value of the slope of the sleep power curve, and therefore, the total power curve rises. The minimum point on the total power curve occurs where the slope of the active power curve and the slope of the sleep power curve are equal and of opposite polarity.

In FIG. 2 since the wait time value, WT, was decreased for the current sample the value of $P_A$ will be less than $PP_A$. Thus, $PP_A$ may be associated with $P_{A1}$ and $WT_1$; $P_A$ may be associated with $P_{A2}$ and $WT_2$; $PP_S$ may be associated with $P_{S1}$ and WT1; and $P_S$ may be associated with $P_{S2}$ and $WT_2$. Since $WT_1$ and $WT_2$ are values greater than that for the total power curve minimum, the absolute value of the slope of active power curve 12 is greater than the absolute value of the slope of sleep power curve 14; and the value $PP_A - P_A$ will be greater than the value of $P_S - PP_S$.

On the other hand, if the samples had been wait times of $WT_3$ and $WT_4$, the points are to the left of the minimum power point, and the absolute value of the slope of active power curve 12 is less than the absolute value of the slope of sleep power curve 14. Thus, the value $PP_A - P_A$ will be less than the value of $P_S - PP_S$. Therefore, in decision block 90, if $[PP_A - P_A] > [P_S - PP_S]$, the current value of WT is to the right of the minimum power point and the next iteration must be with a smaller value of WT. Thus path 91 is followed through reference E to block 82 where the value of wait time, WT, is decreased and the other variables are initialized to begin a new sample.

If on the other hand $[PP_A - P_A] < [P_S - PP_S]$, then the points on curves 12 and 14 are to the left of the minimum power point and the next iteration must be with a larger value of WT. In this case, follow processing path 92 through reference G to processing block 94.

Referring back to decision block 86, if DWN is not equal to one the value of wait time, WT, was increased between the previous sample and the current sample. This means that the subtraction of the two points $P_A$ and $PP_A$ on curve 12 and $P_S$ and $PP_S$ on curve 14 must be reversed to keep the polarity of the two slopes the same. This is accomplished by following process path 96 to decision block 98. In decision block 98, if $[P_A - PP_A] > [PP_S - P_S]$, the current value of WT is to the right of the minimum power point and path 100 is followed through reference E to block 82 in FIG. 5 where WT is decreased, DWN is set to 1, and other variables initialized to begin a new sample. If $[P_A - PP_A]$ is not greater than $[PP_S - P_S]$, follow processing path 102 through reference G to processing block 94.

As with process block 82, process block 94 reinitializes variables to gather another sample. However, in this case DWN is set to 0 and WT is increased by the increment value, I. In addition and as with process block 82, the previous active power value, $PP_A$ is set to $P_A$ and the previous sleep power value, $PP_S$, is set to $P_S$. RC, AC, and TRT are again set to zero.

From processing block 94, follow through reference A to processing block 34. At this juncture in the method, yet another sample is taken and another point is calculated on curves 12 and 14. And the slopes between these points and the two most previously calculated points is again calculated. In this way the method is continually pushing the wait time towards its minimum power value.

This process continues as long as the drive is operating. In this way, if the user changes the host application program or changes the way in which an application is being used, the drive will continually sample the new workload and adjust the wait time to provide minimum power consumption.

Figure 7:
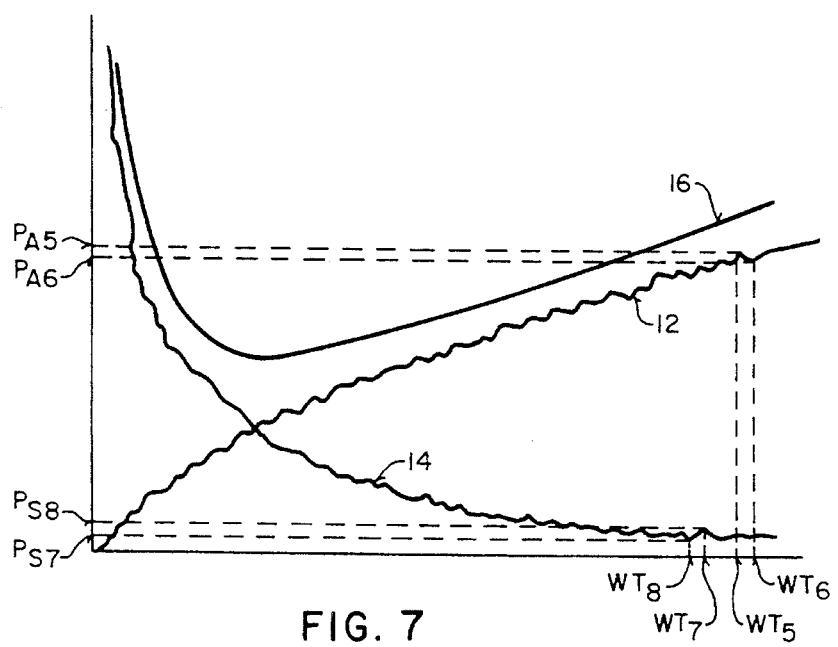
FIG. 7 is a graph showing the effects of a sampled system.

Referring again to FIG. 2, and to FIG. 7, the slope of active curve 12 is always positive and the curve is smooth. This is somewhat idealized. With actual workloads, active power curve 12 and sleep power curve 14 will in fact have small irregularities as illustrated in FIG. 7. Thus, as the slope of curve 12 in FIG. 7 becomes a decreasingly small positive number as wait time becomes long, irregularities can cause the slope of curve 12 to go negative in a small area. In a similar manner, irregularities can cause the slope of curve 14 to go positive.

Figure 8:
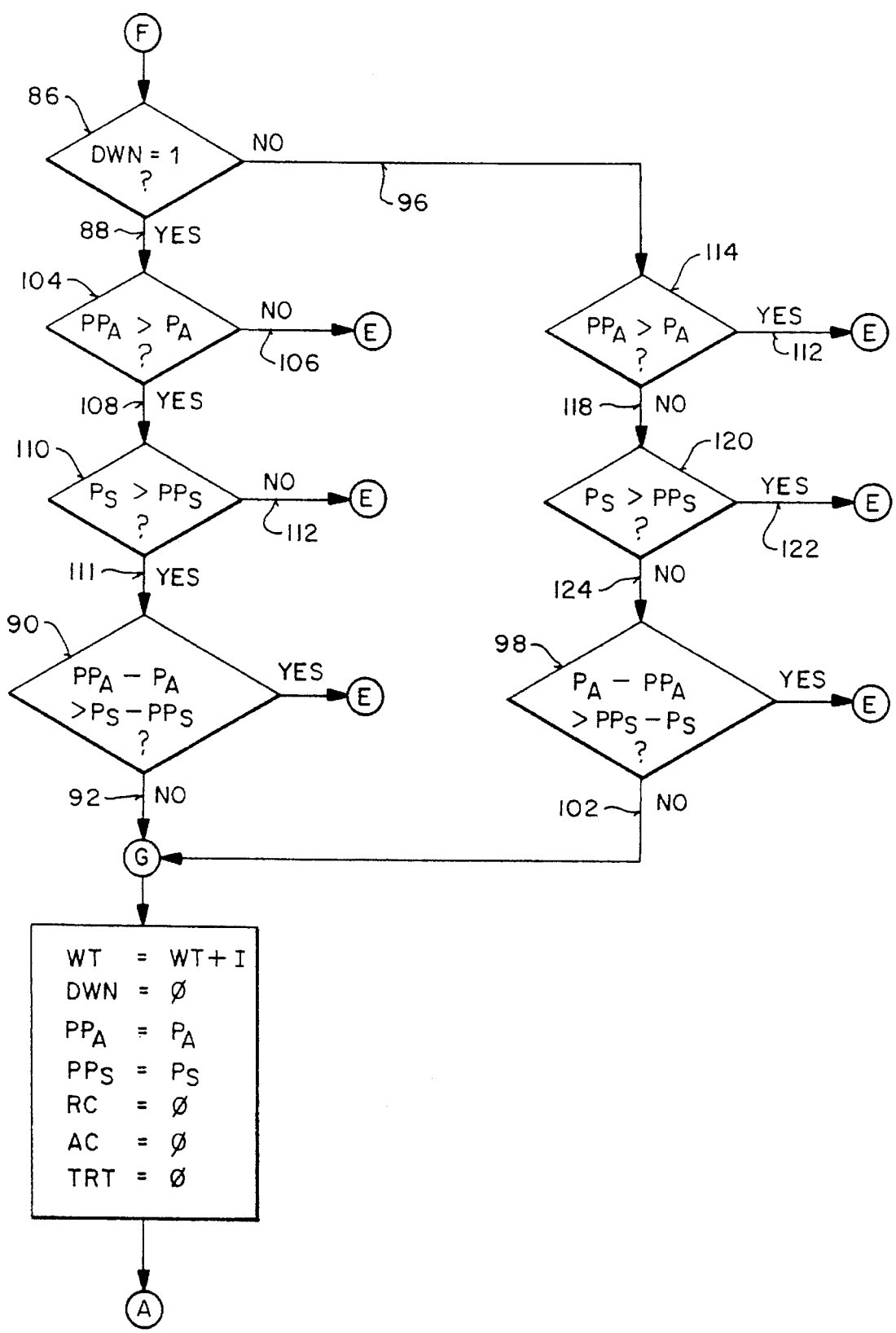
FIG. 8 is a flow chart of the preferred method for handling the problems presented by a sampled system.

To deal with this possibility, additional logic is required. The flow chart for this logic is set in FIG. 8. Referring now to FIG. 8, after decision block 86, two additional decision blocks are inserted in both process paths leaving decision block 86. Starting first with process path 88, decision blocks 104 and 110 are inserted. In process path 96, decision blocks 114 and 120 are inserted.

Since decision block 104 was reached by determining that the value WT was decreased between samples, the value of the previous active power, $PP_A$ may be associated with $P_{A6}$ and $WT_6$ in FIG. 7, and the value of current active power, $P_A$, may be associated with $P_{A5}$ and $WT_5$. Therefore, in decision block 104, if $P_A$ is greater than $PP_A$, the slope of the average active power curve is negative between $WT_5$ and $WT_6$. This can occur either because the points in question on curve 12 are very near the minimum point or because of a local irregularity in curve 12. The method of the invention assumes the latter and takes another sample. In this case the value of WT is decreased for the next sample to move closer to the point of minimum average power. To do this, the method follows processing path 106 through reference E to block 82 in FIG. 5 to decrease the value of WT and initialize to begin a new sample.

If $PP_A$ is greater than $P_A$, in decision block 104 then a local irregularity does not exist at this point on curve 12 and the method follows processing path 108 to decision block 110. In decision block 110, $PP_S$ is compared to $P_S$. Again, since decision block 110 was reached after determining that the value of WT was decreased between samples, the value of previous sleep power, $PP_S$, may be associated with $P_{S7}$ and $WT_7$ in FIG. 7, and the value of current active power, $P_S$, may be associated with $P_{S8}$ and $WT_8$. If $P_S$ is not greater than $PP_S$, the slope of the average sleep power curve is positive between $WT_7$ and $WT_8$. Again, this can occur either because the points in question on curve 14 are very near the minimum point or because of a local irregularity in curve 14. Again the method of the present invention assumes the latter. And again in this case the value of WT is decreased for the next sample to move closer to the point of minimum average power. To do this, the method follows processing path 112 through reference E to block 82 in FIG. 5 to decrease the value of WT and initialize variables and begin a new sample.

Figure 6:
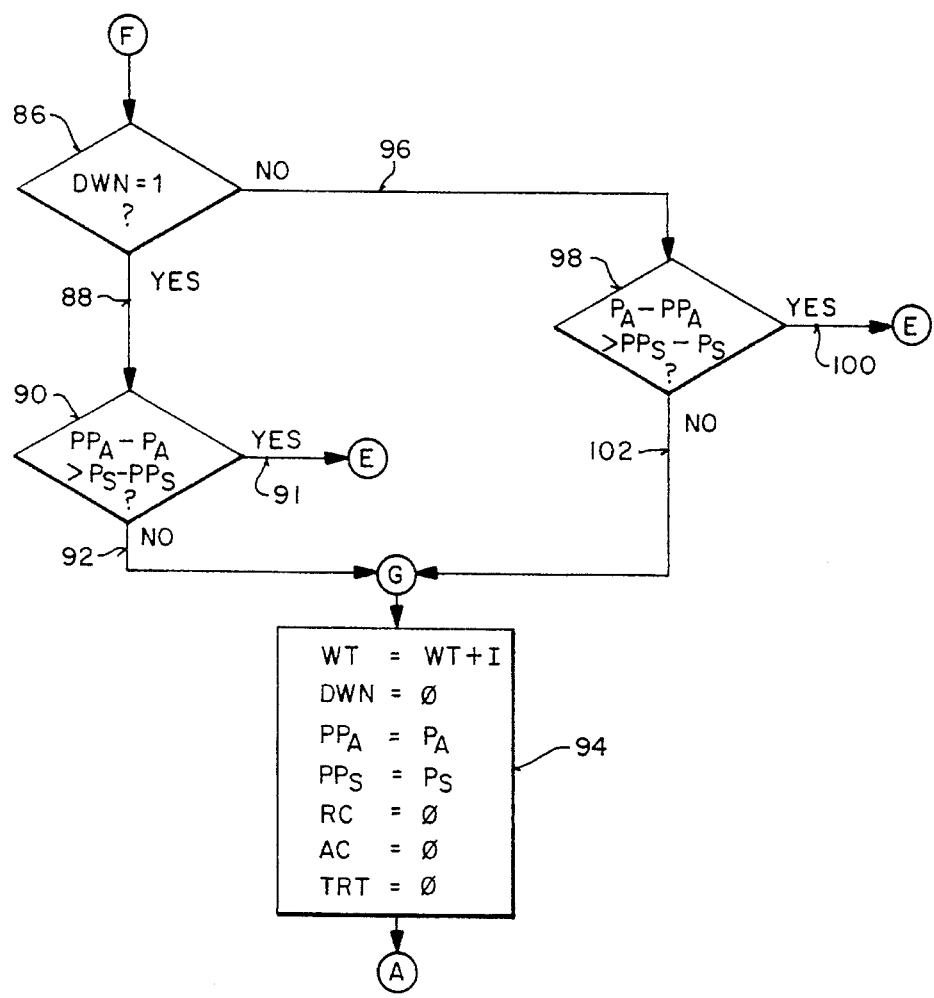
FIG. 6 is a continuation of the flow chart of FIGS. 4 and 5.

If in decision block 110, $P_S$ is greater than $PP_S$, then a local irregularity does not exist on curve 14 and process path 111 is followed to decision block 90 and the method continues as described in connection with FIG. 6.

Referring back to decision block 86 in FIG. 8, if DWN is not 1, then WT was increased between samples and the method follows process path 96 to decision block 114. In decision block 114, again $PP_A$, the previous active power value, is compared with $P_A$, the current active power value.

Since processing block 114 was reached by determining that the value of WT was increased between samples, the value of $P_A$ may be associated with $PA_6$ and $WT_6$ in FIG. 7, and the value of $PP_A$ may be associated with $PA_5$ and $WT_5$. Therefore, in decision block 114, if $PP_A$ is greater than $P_A$, the slope of the average active power curve is negative between $WT_2$ and $WT_1$. This can occur for the reasons previously discussed and the value of WT should be decreased for the next sample to move closer to the point of minimum average power. To do this, the method follows processing path 116 through reference E to block 82 in FIG. 5 where the value of WT is decreased and variables initialized to begin a new sample.

If in decision block 114, $PP_A$ is not greater than $P_A$, then a local irregularity does not exist at this point on curve 12 and the method follows processing path 118 to decision block 120. In decision block 120, $PP_S$ is compared to $P_S$. Again, since decision block 110 was reached after determining that the value of WT was increased between samples, the value of previous sleep power, $PP_S$, may be associated with $P_{S7}$ and $WT_7$ in FIG. 7, and the value of current active power, $P_S$, may be associated with $P_{S8}$ and $WT_8$. If $P_S$ is greater than $PP_S$, the slope of the average sleep power curve is positive between $WT_2$ and $WT_1$. Again, this can occur for the reasons previously discussed and the value of WT should be decreased for the next sample to move closer to the point of minimum average power. To do this, the method follows processing path 122 through reference E to block 82 to decrease the value of WT and initialize to begin a new sample.

If in decision block 120, $P_S$ is not greater than $PP_S$, then a local irregularity does not exist at this point on curve 14 and the method follows process path 124 to decision block 98 and the method continues as described in connection with FIG. 6.

It will be appreciated from the foregoing that the preferred embodiment is subject to numerous adaptations and modifications without departing from the scope of the invention. In particular, the detailed description of the invention has been limited to an embodiment that uses only two most important states: the active and sleep. However, the principles of the present invention as described generally and with respect to a preferred embodiment apply equally to a system that uses more than two states. Therefore, it is to be understood that, within the scope of the appended claims, the invention may be practiced other than as specifically described herein.

What is claimed is:

1. A method of managing the power consumed by a disk drive in a host computer system as a result of a work load placed on said disk drive by said host computer, said method comprising the following steps:

providing a host that sends access requests to a disk drive;

providing a disk drive that is operatively connected to said host, is capable of storing data, and is capable of transferring data with said host in response to access requests by said host, wherein said disk drive is capable of operating in at least a first state in which said disk drive responds to an access request from said host in a first time and consumes a known first power and wherein after a wait time shifting to a second state in which said disk drive responds to an access request from said host more slowly than said first time in said first state and consumes a known second power which is less than said known first power;

collecting data on access requests between said host and said disk drive that provides information on the work load placed upon said disk drive by said host;

wherein the work load associated with the access requests by said host to said disk drive is likely to be unique relative to the work load associated with the access requests that would be placed upon said disk drive by another arbitrarily chosen host; and using said data to determine a wait time for shifting said disk drive from said first state to said second state such that the power consumed by said disk drive to respond to access requests made by said host tends toward a minimum, based upon the work load associated with the access requests between said host and said disk drive.

2. A method of managing the power consumed by a hard disk drive in a host computer system as a result of a work load placed on said hard disk drive by said host computer and wherein said hard disk drive is capable of operating in at least a first state in which the hard disk drive responds to an access request from said host in a minimum time and consumes a known maximum power and wherein after a wait time shifting to a second state in which said hard disk drive responds to an access from said host more slowly than in said first state and consumes a known second power which is less than said maximum power, said method comprising the following steps:

collecting data that provides information on the work load placed upon said hard disk drive by said host;

using said data to determine a wait time such that the total power consumed by said hard disk drive to respond to substantially all access requests made by said host is minimized;

wherein said step of collecting data that provides information on the work load placed on said hard disk drive by said host computer includes determining the number of host computer access requests made from said first operating state and said second operating state as a function of wait time.

3. The method of claim 2 wherein determining the wait time such that the total power consumed by said hard disk drive to respond to substantially all access requests made by said host is minimized comprises:

using said number of host computer access requests made from said first state to calculate a first power function corresponding to the average power required to respond to a request from said host while said hard disk drive is in said first state as a function of wait time;

using said number of host computer access requests made from said second state to calculate a second power function corresponding to the average power required to respond to a request from said host while said hard disk drive is in said second state as a function of wait time;

summing said first and second power function to create a third power function corresponding to the total average power consumed by said hard disk drive to respond to substantially all access requests made by said host as a function of wait time;

determining the wait time for which said total average power is a minimum; and causing said hard disk drive to shift from said first to said second state at said wait time when the total average power is a minimum.

4. The method of claim 3 wherein determining the wait time for which said third power function is a minimum comprises determining the wait time at which said third power function has a slope equal to zero.

5. The method of claim 4 wherein determining the wait time at which said third power function has a slope substantially equal to zero comprises:

determining a first value proportional to the slope of said first power function;

determining a second value proportional to the slope of said second power function;

comparing said first value with said second value;

determining the wait time at which the absolute value of said first value is substantially equal to the absolute value of said second value:

causing said hard disk drive to shift from said first to said second state at said wait time at which the absolute values of said first and second values are substantially equal.

6. The method of claim 5 wherein determining said first value proportional to the slope of said first power function includes:

taking a first sample of the number of requests from said host that are responded to from said first state as a percent of the total number of requests responded to by said disk drive for a first wait time;

determining, from said number of requests from said host that are responded to from said first state in said first sample, a first average power value required to respond to requests for access from said host from said first state for said first wait time;

taking a second sample of the number of requests from said host that are responded to from said first state as a percent of the total number of requests responded to by said disk drive for a second wait time equal to said first wait time plus a predetermined time increment;

determining, from said number of requests from said host that are responded to from said first state in said second sample, a second average power value required to respond to access requests from said host from said first state for said second wait time;

determining the difference between said first and second average power values required to respond to requests for access from said host from said first state.

7. The method of claim 6 wherein determining said second value proportional to the slope of said second power function includes:

taking a first sample of the number of requests from said host that are responded to from said first state as a percent of the total number of requests responded to by said disk drive for a first wait time;

determining, from said first sample of requests, the number of requests from said host that are responded to from said second state as a percent of the total number of requests responded to by said disk drive for a first wait time by subtracting from one the percent of the total number of requests responded to by said disk drive from said first state for a first wait time;

determining, from said number of requests from said host that are responded to from said second state from said first sample, a first average power value required to respond to requests for access from said host from said first state for said first wait time;

taking a second sample of the number of requests from said host that are responded to from said first state as a percent of the total number of requests responded to by said disk drive for a second wait time equal to said first wait time plus a predetermined time increment;

determining, from said number of requests from said host that are responded to from said second state in said second sample, a second average power required to respond to access requests from said host from said first state for said second wait time;

determining the difference between said first and second average power values required to respond to requests for access from said host from said second state.

8. The method of claim 7 further including the steps of:

determining, prior to determining said first and second value proportional to the slope of said first and second power functions, if their is a local irregularity in said first average power function in the area of said second wait time causing the slope of said function to reverse polarity in said area;

if yes, abandoning said second sample and taking a third sample at a wait time closer to said minimum wait time;

determining, prior to determining said first and second value proportional to the slope of said first and second power functions, if their is a local irregularity in said second average power function in the area of said second wait time causing the slope of said function to reverse polarity in said area; and if yes, abandoning said second sample and taking a third sample at a wait time closer to said minimum wait time.

9. The method of claim 7 wherein determining the wait time at which the absolute value of the slope of said first power function is substantially equal to the absolute value of the slope of said second power function includes:

determining if the wait time at which said first sample was taken is greater than the wait time at which said second sample was taken;

if yes, subtracting the difference between said first and second average power values required to respond to requests for access from said host from said second state from the difference between said first and second average powers values required to respond to requests for access from said host from said first state to form a power difference;

if no, subtracting the difference between said second and first average power values required to respond to requests for access from said host from said first state from the difference between said first and second average powers values required to respond to requests for access from said host from said second state to form said power difference;

if said average power difference is greater than zero by more than a predetermined minimum power difference, iterate the method by taking a third sample of the number of requests from said host that are responded to from said first state as a percent of the total number of requests responded to by said disk drive for a third wait time equal to said second wait time minus a predetermined increment;

if said average power difference is less than zero by more than a predetermined minimum power difference, iterate the method by taking a third sample of the number of requests from said host that are responded to from said first state as a percent of the total number of requests responded to by said disk drive for a third wait time equal to said second wait time plus a predetermined increment;

if said average power difference is equal to or less than said predetermined power difference value, causing said hard disk drive to shift from said first state to said second state at said second wait time.

10. The method of claim 8 wherein said predetermined minimum power difference is substantially zero.

11. A method of managing the power consumed by a hard disk drive in a host computer system as a result of a work load placed on said hard disk drive by said host computer and wherein said hard disk drive is capable of operating in the active state in which the hard disk drive responds to an access request from said host in a minimum time and consumes a known maximum power and wherein after a wait time shifting to the sleep state in which said hard disk drive responds to an access from said host more slowly than in said active state and consumes a known sleep power which is less than said maximum power, said method comprising the following steps:

taking a first sample of the number of requests from said host that are responded to from said active state as a percent of the total number of requests responded to by said disk drive for a first wait time;

from said number of requests from said host that are responded to from said active state in said first sample, determining an active average power value required to respond to requests for access from said host from said active state for said first wait time;

taking a second sample of the number of requests from said host that are responded to from said active state as a percent of the total number of requests responded to by said disk drive for a second wait time equal to said first wait time plus a predetermined time increment;

from said number of requests from said host that are responded to from said active state in said second sample, determining a second average power value required to respond to access requests from said host from said active state for said second wait time;

determining the difference between said first and second average power values required to respond to requests for access from said host from said active state;

from said first sample of requests, determining the number of requests from said host that are responded to from said sleep state as a percent of the total number of requests responded to by said disk drive for a first wait time by subtracting from one the percent of the total number of requests responded to by said disk drive from said active state for a first wait time;

from said number of requests from said host that are responded to from said sleep state from said first sample, determining a first average power value required to respond to requests for access from said host from said active state for said first wait time;

from said number of requests from said host that are responded to from said sleep state in said second sample, determining a second average power required to respond to access requests from said host from said active state for said second wait time;

determining the difference between said first and second average power values required to respond to requests for access from said host from said sleep state;

determining if the wait time at which said first sample was taken is greater than the wait time at which said second sample was taken;

if yes, subtracting the difference between said active and sleep average power values required to respond to requests for access from said host from said sleep state from the difference between said active and sleep average powers values required to respond to requests for access from said host from said active state to form a power difference;

if no, subtracting the difference between said sleep and active average power values required to respond to requests for access from said host from said active state from the difference between said active and sleep average powers values required to respond to requests for access from said host from said sleep state to form said power difference;

if said average power difference is greater than zero by more than a predetermined minimum power difference, iterate the method by taking a third sample of the number of requests from said host that are responded to from said active state as a percent of the total number of requests responded to by said disk drive for a third wait time equal to said second wait time minus a predetermined increment;

if said average power difference is less than zero by more than a predetermined minimum power difference, iterate the method by taking a third sample of the number of requests from said host that are responded to from said active state as a percent of the total number of requests responded to by said disk drive for a third wait time equal to said second wait time plus a predetermined increment; and if said average power difference is equal to or less than said predetermined minimum power difference value, causing said hard disk drive to shift from said active state to said sleep state at said sleep wait time.

12. The method of claim 11 further including the steps of:

prior to determining said first and second value proportional to the slope of said first and second power functions, determining if their is a local irregularity in said first average power function in the area of said second wait time causing the slope of said function to reverse polarity in said area;

if yes, taking a third sample at a wait time closer to said minimum wait time;

prior to determining said first and second value proportional to the slope of said first and second power functions, determining if their is a local irregularity in said second average power function in the area of said second wait time causing the slope of said function to reverse polarity in said area; and if yes, taking a third sample at a wait time closer to said minimum wait time.

13. The method of claim 12 wherein said sample size is at least 100.

14. The method of claim 13 wherein said predetermined times increment is one second.

15. The method of claim 12 wherein said minimum power difference is zero.

16. The method of claim 12 wherein said step of determining an active average power value required to respond to requests for access from said host from said active state for said active wait time comprises solving for $P_{Active}$ in the following expression $$P_{Active} = \%_A \frac{t_{awA} P_a + C_1}{t_{awA} + C_2}.$$

17. The method of claim 12 wherein said step of determining a active average power value required to respond to requests for access from said host from said sleep state for said active wait time comprises solving for $P_{Sleep}$ in the following expression $$P_{Sleep} = (1 - \%_A) \frac{t_{wait} P_a + C_3}{t_{wait} + C_4}.$$

18. The method of claim 12 further including the step of determining if a particular sample is the first sample taken since said hard disk drive was powered up.

19. A method of managing the power consumed by a hard disk drive in a host computer system as a result of a work load placed on said hard disk drive by said host computer and wherein said hard disk drive is capable of operating in a first state in which the hard disk drive responds to an access request from said host in a minimum time and consumes a known maximum power and wherein after a wait time shifting to a second state in which said hard disk drive responds to an access from said host more slowly than in said first state and consumes a known second power which is less than said maximum power, said method comprising the following steps:

collecting statistics on the arrival time of requests from said host;

using said statistics to calculate a first power function corresponding to the average power required to respond to a request from said host while said hard disk drive is in said first state as a function of wait time;

using said statistics to calculate a second power function corresponding to the average power required to respond to a request from said host while said hard disk drive is in said second state as a function of wait time;

summing said first and second power function to create a third power function corresponding to the total average power consumed by said hard disk drive to respond to substantially all access requests made by said host as a function of wait time;

determining the wait time for which said total average power is a minimum; and causing said hard disk drive to shift from said first to said second state at said wait time when the total average power is a minimum.

20. The method of claim 19 wherein said first state is the active state and said second state is the sleep state.

21. The method of claim 19 further characterized by the steps of:

compensating for any local irregularity in said first and second power functions causing the slope of said function to reverse polarity in said area.

22. The method of claim 1 wherein the work load includes the timing of access requests between said host and said disk drive.

23. The method of claim 1 wherein the work load includes the number of access requests between said host and said disk drive.

24. A disk drive for responding to access requests from a host and having adaptive power consumption tailored to the work load associated with responding to access requests by the host, said disk drive comprising:

means for operating in at least a first state in which said disk drive responds to an access request from the host in a first time and consumes a known first power and wherein after a wait time shifting to a second state in which said disk drive responds to an access request from the host more slowly than said first time in said first state and consumes a known second power which is less than said known first power;

means for collecting data on the work load of said disk drive responding to access requests by the host, wherein the work load placed upon said disk drive by the host is likely to be unique relative to the work load placed upon the disk drive by another arbitrarily chosen host; and means for determining a wait time, from said data, for shifting said disk drive from said first state to said second state such that the power consumed by said disk drive to respond to access requests provided by the host tends toward a minimum, based upon the work load associated with responding to access requests by the host.

25. The disk drive of claim 24, wherein:

said means for collecting data includes means for determining the number of host access requests made from said first state and said second state as a function of wait time.

26. The disk drive of claim 24, wherein:

said means for determining a wait time includes means for determining a first and a second power required by said disk drive to respond to access requests by the host while said disk drive is in said first and second states, respectively, and determining a wait time, from said first and second powers, which reduces the power required by said disk drive to respond to access requests by the host from both of said first and second states.

27. The disk drive of claim 26, wherein:

said means for determining said first power includes means for solving for Ps1 in the following expression $$P_{s1} = \%_{s1} \frac{t_{s1wA} P_{s1} + C_1}{t_{s1wA} + C_2}$$

wherein:

Ps1 is said first power required by said disk drive to respond to access requests by said host while said disk drive is in said first state;

%s1 is the percentage of the total access requests that said disk drive responds to from said first state;

Ts1wa is the average time that said disk drive is in said first state waiting for an access requests to arrive from the host;

Ps1 is the power required by said disk drive while in said first state;

C1 is the power required by said disk drive to perform access requests from the host when said disk drive is in said first state; and C2 is the time required by said disk drive to perform access requests from the host when said disk drive is in said first state.

28. The disk drive of claim 26, wherein:

said means for determining said second power includes means for solving for Ps2 in the following expression $$P_{s2} = \%_{s2} \frac{t_{s2wA} P_{s2} + C_3}{t_{s2wA} + C_4}$$

wherein:

Ps2 is said second power required by said disk drive to respond to access requests by said host while said disk drive is in said second state;

%s2 is the percentage of the total access requests that said disk drive responds to from said second state;

Ts2wa is the average time that said disk drive is in said second state waiting for an access requests to arrive from the host;

Ps2 is the power required by said disk drive while in said second state;

C3 is the power required by said disk drive to perform access requests from the host when said disk drive is in said second state; and C4 is the time required by said disk drive to perform access requests from the host when said disk drive is in said second state.

29. The disk drive of claim 26, wherein:

said means for determining a first and a second power includes means for determining a first and second number of access requests by the host that said disk drive responds to from said first and second states, respectively, and determining the power required by said disk drive to respond to said first and second number of access requests from said first and second states, respectively.

30. The disk drive of claim 24, wherein:

said means for determining a wait time includes means for determining a first and a second power function corresponding to the power required by said disk drive to respond to access requests by the host while said disk drive is in said first and second states, respectively, as a function of wait time and determining a wait time for which the slope of the sum of said first and second power functions is substantially zero.

31. The disk drive of claim 30, wherein:

said means for determining a first and a second power function includes means for sampling the number of access requests by the host that said disk drive responds to from each of said first and second states and determining the power required by said disk drive to respond to the sampled number of access requests for each of said first and second states.

* * * * *